(12) United States Patent
Choi et al.

(10) Patent No.: US 9,292,106 B2
(45) Date of Patent: Mar. 22, 2016

(54) INTERFACE APPARATUS USING MOTION RECOGNITION, AND METHOD FOR CONTROLLING SAME

(71) Applicant: MOGENCELAB CORPORATION, Seoul (KR)

(72) Inventors: Lee-Kwon Choi, Seoul (KR); Su-hwan Sho, Yongin-si (KR); Seung-Kwon Lee, Seoul (KR); Jeong-Eun Heo, Incheon (KR); Eun-Jin Kim, Seoul (KR); Se-Ra Jeon, Bucheon-si (KR); Hyun-Taek Chun, Seoul (KR)

(73) Assignee: MOGENCELAB CORPORATION, Seoul (KR)

( * ) Notice: Subject to any disclaimer, the term of this patent is extended or adjusted under 35 U.S.C. 154(b) by 0 days.

(21) Appl. No.: 14/383,128

(22) PCT Filed: Mar. 6, 2013

(86) PCT No.: PCT/KR2013/001799
§ 371 (c)(1),
(2) Date: Sep. 5, 2014

(87) PCT Pub. No.: WO2013/133624
PCT Pub. Date: Sep. 12, 2013

(65) Prior Publication Data
US 2015/0035751 A1 Feb. 5, 2015

(30) Foreign Application Priority Data

Mar. 6, 2012 (KR) .................. 10-2012-0022683

(51) Int. Cl.
*G06F 3/033* (2013.01)
*G09G 5/08* (2006.01)
*G06F 3/0346* (2013.01)
*G06F 3/01* (2006.01)
*G06F 3/0481* (2013.01)

(52) U.S. Cl.
CPC ............. *G06F 3/0346* (2013.01); *G06F 3/017* (2013.01); *G06F 3/04812* (2013.01)

(58) Field of Classification Search
CPC ....... G06F 3/011; G06F 3/017; G06F 3/0346; G06F 3/04812
USPC ....................................................... 345/158
See application file for complete search history.

(56) References Cited

U.S. PATENT DOCUMENTS

2004/0046736 A1* 3/2004 Pryor et al. ................. 345/156

* cited by examiner

*Primary Examiner* — Gustavo Polo
(74) *Attorney, Agent, or Firm* — Paratus Law Group, PLLC

(57) ABSTRACT

Provided are a 3-dimensional interface device through motion recognition and a control method thereof, and is a method of controlling an operation range and a movement speed of the interface device. The interface device includes a display unit which is a display unit, a control terminal generating an output signal output to the display unit and controlling drive of the display unit, and an interface unit connected to the control terminal, receiving a user's command from a user, and transmitting the user's command to the control terminal. The interface unit includes a detecting unit detecting a user's motion, and a control unit controlling drive of the interface unit.

15 Claims, 5 Drawing Sheets

INTERFACE APPARATUS USING MOTION RECOGNITION, AND METHOD FOR CONTROLLING SAME

CROSS REFERENCE TO PRIOR APPLICATIONS

This application is a National Stage Patent Application of PCT International Patent Application No. PCT/KR2013/001799 (filed on Mar. 6, 2013) under 35 U.S.C. §365(C), which claims priority to Korean Patent Application No. 10-2012-0022683 (filed on Mar. 6, 2012), which are all hereby incorporated by reference in their entirety.

BACKGROUND OF THE INVENTION

The present invention relates to a 3-dimensional (3D) interface device through motion recognition and a control method thereof, and, in particular, to a method of controlling an operation range and a movement speed of the interface device. The work related to the present invention was partly supported by the Korea Creative Content Agency (KOCCA) [Grant No.: 211A5020021098901013, Period: Jul. 1, 2011-Mar. 31, 2014, Title: Development of Integrated Technology for Evolutionary Interactive Display Responding to Spectator Reaction].

Typically, as an interface device that a user inputs a command to an electronic device, a keyboard for inputting characters and a mouse for selecting a specific position on a display are representatively used.

Recently, as a mouse device, a spatial mouse is proposed for detecting and pointing a position in a 3 dimensional space and controlling an operation of the mouse. For control, this spatial mouse allows a pointing direction or position to be mapped on a screen according to a movement of a hand or an arm in a state where the mouse is gripped by the hand, and includes an additional button for a click operation. In addition, a spatial mouse is being developed in a type of being coupled to a specific part of a body by improving the typical spatial mouse.

Korean Patent Application Laid-Open No. 10-2010-0074461 discloses a spatial mouse device coupled to a wrist, detecting a movement, and, through this, performing mapping.

However, it is difficult to set a movement range and a movement speed of a spatial mouse according to user characteristics and preference.

SUMMARY OF THE INVENTION

The present invention provides a control method of an interface apparatus through motion recognition, which allows a movement range and a movement speed of a spatial interface to be controlled according to body characteristics and preference of a user.

Embodiments of the present invention provide an interface apparatus through motion recognition including: a display unit which is a display unit; a control terminal generating an output signal output to the display unit and controlling drive of the display unit; and an interface unit connected to the control terminal, receiving a user's command from a user, and transmitting the user's command to the control terminal, wherein the interface unit comprises a detecting unit detecting a user's motion; and a control unit controlling drive of the interface unit.7

In some embodiments, any one of the control terminal or the control unit may set a movement range or a movement speed of a pointer for a user's motion detected by the detecting unit.

In other embodiments, the movement range setting of the pointer may include setting by detecting a motion movement trajectory of the user for a predetermined time, and matching a maximum movement value of the detected movement trajectory with a maximum value of the movement range of the point on the display unit.

In still other embodiments, the detecting of the user's motion may be performed by detecting a movement of a recognition module prepared in the user.

In even other embodiments, the detecting unit may include a capturing device, wherein the detecting of the user's motion is performed by determining a specific body part of the user from images captured by the capturing device and detecting the movement of the specific body part.

In yet other embodiments, any one of the control terminal or the control unit may store the movement range and the movement speed set for each user, and control a movement of the pointer by a set value set for each user recognized by the detecting unit.

In other embodiments of the present invention, control methods of an interface device through motion recognition, which includes a detecting unit detecting a user's motion and a control unit controlling drive of the interface device, include receiving a setting or change command of the interface device from a user; detecting, by the detecting unit, a motion movement trajectory of the user for a predetermined time; calculating a maximum movement value for the detected movement trajectory of the user; and matching the calculated maximum movement value with a maximum value of a movement range of the pointer on a display unit and setting a movement range and a movement speed of a pointer of the interface device.

In some embodiments, the detecting of the motion may be performed by detecting a movement of a recognition module prepared to the user.

In other embodiments, the detecting unit may include a capturing device, wherein the detecting of the motion is performed by determining a user's specific body part from images captured by the capturing device and detecting a movement of the specific body part.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

Hereinafter, it will be described about an exemplary embodiment of the present invention in conjunction with the accompanying drawings.

Hereinafter, it will be described about an interface device through motion recognition and a control method thereof according to an exemplary embodiment of the present invention in conjunction with the accompanying drawings.

In the specification, the interface device is used as having the same meaning as a 3-dimensional (3D) mouse or a spatial mouse for controlling a mouse pointer in a 3D space.

Figure 1:
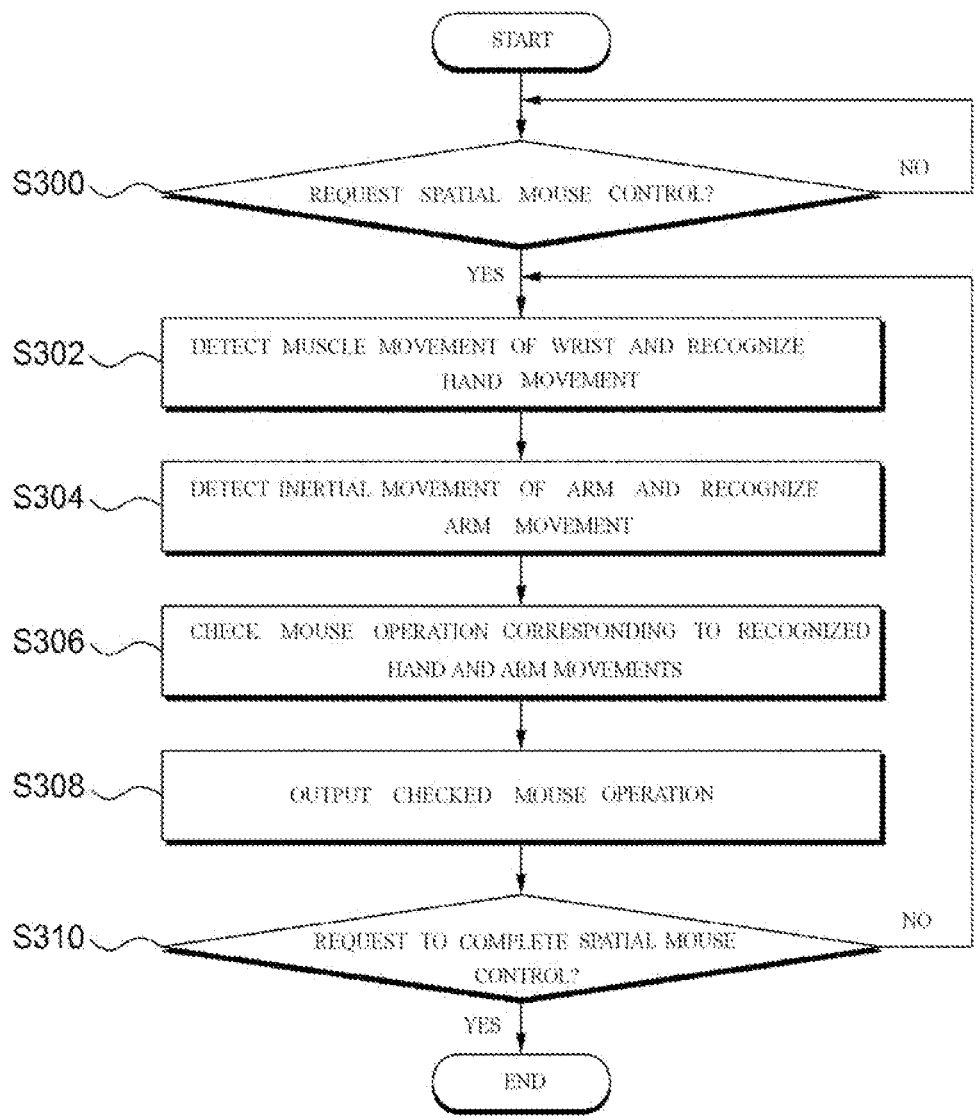
FIG. 1 is a flowchart illustrating a typical 3-dimensional (3D) mouse control method.
Figure 2:
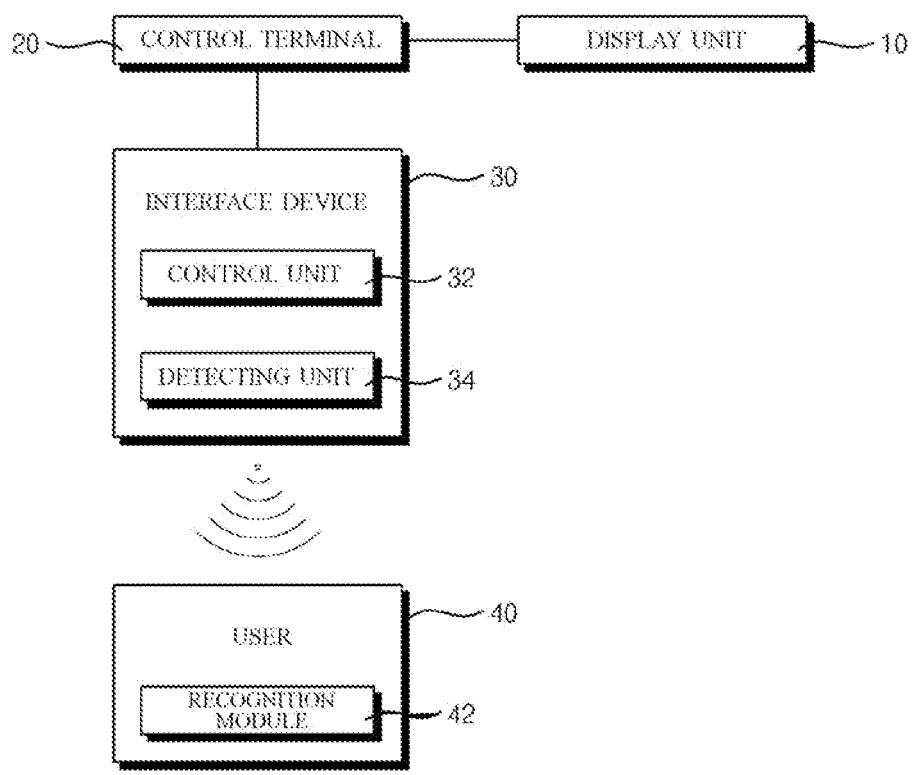
FIG. 2 is a block diagram illustrating a configuration of an interface device through motion recognition according to an embodiment of the present invention.

FIG. 2 is a block diagram illustrating a configuration of an interface device through motion recognition according to an embodiment of the present invention.

As illustrated in FIG. 2, an interface device through motion recognition according to an embodiment of the present invention includes a display unit 10, a control terminal 20, and an interface device 30.

The display unit 10 is a user display device and refers to a typical display output device.

Furthermore, the control terminal 20 is to produce a result output to the display unit 10 and means typically a computer.

In addition, the interface device 30 plays a role of recognizing a user's motion to be described later, moving and mapping an interface pointer through the recognition, and allowing a user command to be input.

Here, the mapping means moving a position of a pointer representing an input position of the interface device 30 in correspondence to a movement command (motion) of the user.

To this end, the interface device 30 includes a detecting unit 34 and a control unit 32. The detecting unit 34 is a part for detecting a user's motion, and the control unit 32 plays a role of moving the pointer according to the user's motion detected by the detecting unit 34.

In addition, the control unit 32 sets a movement range of the pointer according to user setting and sets a movement speed of the pointer according to the set movement range.

On the other hand, various schemes may be applied to a scheme that the detecting unit 34 recognizes the user's motion, and hereinafter various embodiments of motion recognition by the detecting unit 34 are described.

First Embodiment

A first embodiment that the detecting unit 34 recognizes the user's motion employs a scheme that a movement of a recognition module prepared in a specific part of the user's body is detected. For example, it is a scheme that when the user 40 attaches a recognition module 42 to a hand and moves the hand, the detecting unit 34 detects the movement of the recognition module 42 and detects the movement of the user's hand.

However, for the first embodiment, it is advantageous in that motion recognition ratio of the detecting unit 34 is increased, but it is inconvenient that the user prepares the separate recognition module 42.

Second Embodiment

In order to compensate for the inconveniency of the first embodiment, a second embodiment employs a capturing device in the detecting unit and allows a shape of the user to be recognized. Accordingly, the detecting unit 34 consecutively obtains images of a user, determines a specific part of the user's body from the obtained images, and then detects a movement of the specific body part.

Accordingly, in the second embodiment, since the user's motion may be recognized without an additional recognition module, user's convenience can be increased.

Furthermore, for the second embodiment, a movement range of a pointer, which is set for each user, may be stored in a storage unit (not shown) of the interface device, and a movement of the pointer may be allowed to be controlled by each stored set value for the user recognized by the detecting unit.

Hereinafter a control method of an interface device through the motion recognition according to the present invention is described with the accompanying drawing.

Figure 3:
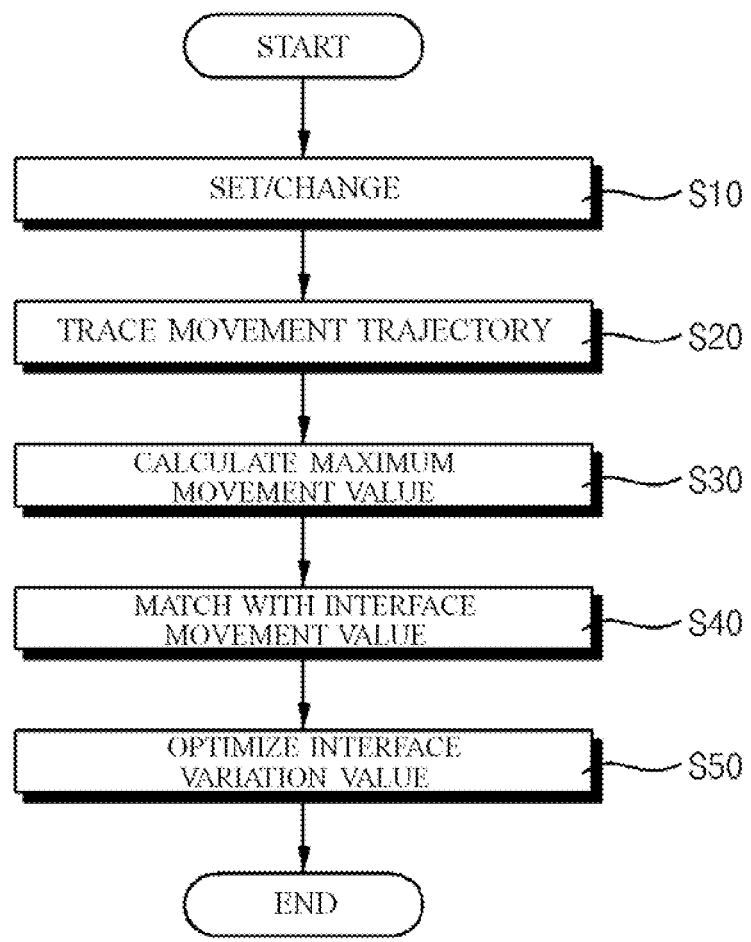
FIG. 3 is a flowchart illustrating a control method of an interface device through motion recognition according to an embodiment of the present invention.
Figure 4:
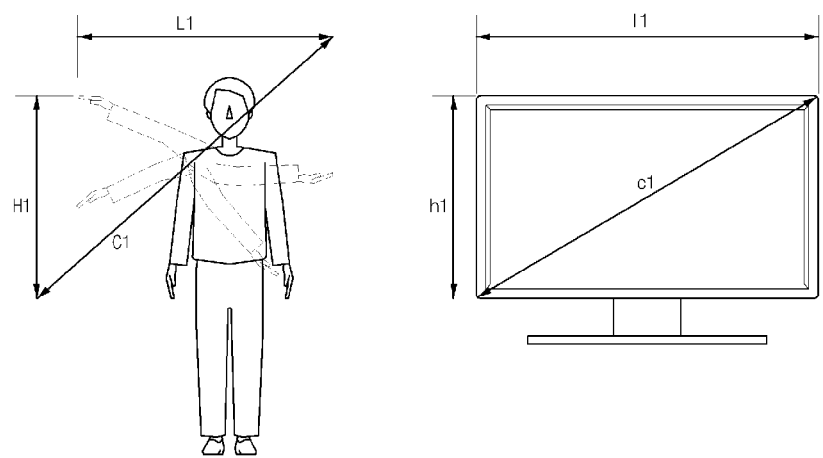
FIGS. 4 and 5 are exemplary views illustrating control methods of an interface device through motion recognition according to an embodiment of the present invention.
Figure 5:
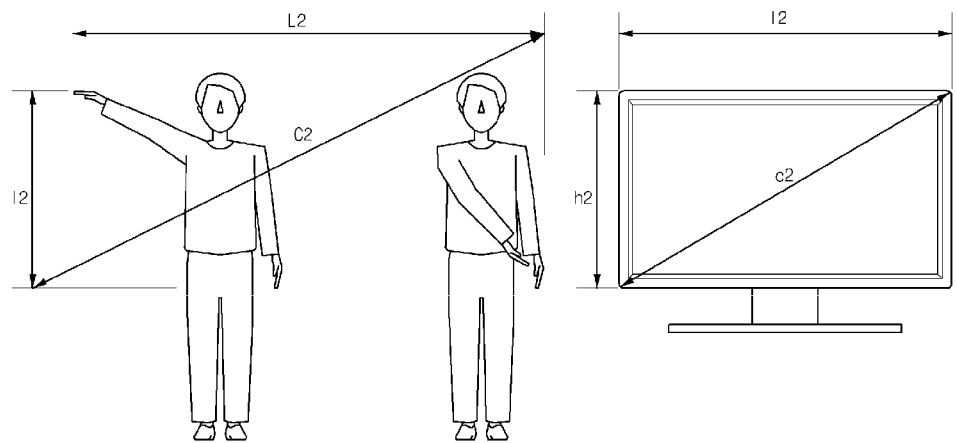

FIG. 3 is a flowchart illustrating a control method of an interface device through motion recognition according to an embodiment of the present invention, and FIGS. 4 and 5 are exemplary views of illustrating a control method of an interface device through motion recognition according to an embodiment of the present invention.

As illustrated in FIG. 3, a method of setting a movement range of a pointer of the interface device 30 according to an embodiment of the present invention is started to receive, by the interface device, an input of a separate setting or change command for separate pointer setting from the user (operation S10).

Here, when the control unit 32 of the interface device 30 is responsible for controlling the interface device 30, thereafter setting process is performed by the control unit 32 of the interface device 30. When the control terminal 20 is responsible for controlling the interface device 30, the setting process is performed by the control terminal 20.

In other words, the interface control setting may be performed by any one of the interface device itself or a connected control terminal according to the specification of the interface device 30.

Hereinafter, it is exemplarily described that the interface control setting is set by the interface device itself After the interface device 30 receives a setting (or change) command, the detecting unit 34 traces a motion movement trajectory of the user for a predetermined time (operation S20).

At this point, the trace of the movement trajectory is performed differently according to a scheme of the detecting unit 34.

In other words, for the first embodiment, the trace is performed by tracing a movement trajectory of the recognition module 42 attached to the user. For the second embodiment, the trace is performed by recognizing a specific part (hereinafter, the right hand is assumed) of the user's body and by tracing a movement trajectory of the right hand.

Thereafter, the control unit 32 calculates a maximum movement value with respect to the detected user's movement trajectory (operation S30).

In other words, as described in FIG. 4, when the user rotates his/her right hand, a maximum up and down movement distance H1, a maximum right and left movement distance L1, and a diagonal distance C1 calculated from them are calculated.

Alternatively, as illustrated in FIG. 5, when the user moves his/her right hand while moving his/her body, a maximum up and down movement distance H2, a maximum right and left movement distance L2, and a diagonal distance C2 including the movement distance of the user are calculated.

After the calculation of the maximum movement value, a movement distance of a pointer of the display unit 10 is matched with the maximum movement value (operation S40).

In other words, in the embodiment illustrated in FIG. 4, the movement distance of the pointer is matched by matching movement distances (h1, l1, c1) of the display unit with the maximum movement distances (H1, L1, C1) of the user. In the embodiment illustrated in FIG. 5, the movement distance of the pointer is matched by matching movement distances (h2, l2, c2) of the display unit with the maximum movement distances (H2, L2, C2) of the user.

Then, the control unit 32 sets and stores a movement speed (a change value) of the pointer according to the set movement range of the pointer (operation s50).

Furthermore the setting content of the set interface device 30 may be stored and used.

In other words, the setting content of the interface device, which is set for each user, is stored on a storage space. As illustrated in the second embodiment, when the detecting unit identifies the user, the interface device 30 may be controlled by different setting values for each identified user.

The present invention relates to a 3D interface device performing a control using motion detection and a control method thereof, and, particularly, to a method of controlling a movement range of a movement speed of the interface device. According to embodiments of the present invention, the input range of the spatial interface device can be set as large as desired, and accordingly a speed of a mapping pointer can be adjusted. Therefore, a spatial interface device adjustable to characteristics and preference of the user can be provided.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. Interface apparatus using motion recognition comprising:
    a display unit which displays a pointer;
    a control terminal generating an output signal output to the display unit and controlling drive of the display unit; and
    an interface unit connected to the control terminal, receiving a user's command from a user, and transmitting the user's command to the control terminal,
    wherein the interface unit comprises:
        a detecting unit detecting a user's motion; and
        a control unit controlling drive of the interface unit,
    wherein one or more of the control terminal and the control unit sets a movement range of the pointer upon receipt of a setting command from the user by detecting a movement trajectory of the user for a predetermined time, and matches a maximum movement value of the detected movement trajectory with a maximum value of the movement range of the pointer on the display unit.

2. The interface apparatus claim 1, wherein the one or more of the control terminal and the control unit sets a movement speed of the pointer for the user's motion detected by the detecting unit.

3. The interface apparatus of claim 1, wherein the detecting of the user's motion is performed by detecting a movement of a recognition module prepared in the user.

4. The interface apparatus of claim 1, wherein the detecting unit comprises a capturing device.

5. The interface apparatus of claim 2, wherein the one or more of the control terminal and the control unit stores the movement range and the movement speed set for each one of a plurality of users, and controls a movement of the pointer by a set value for motion detected from each one of the plurality of users recognized by the detecting unit.

6. A method for controlling of an interface apparatus using motion recognition, which comprises a detecting unit detecting a motion of a user and a control unit controlling drive of the interface apparatus, comprising:
    receiving, by the control unit, a setting command of the interface apparatus from the user;
    detecting, by the detecting unit, a movement trajectory of the user for a predetermined time;
    calculating a maximum movement value for the detected movement trajectory of the user; and
    setting a movement range of a pointer displayed on a display unit based on matching the calculated maximum movement value with a maximum value of the movement range of the pointer displayed on the display unit.

7. The method of claim 6, wherein the detecting of the motion is performed by detecting a movement of a recognition module prepared to the user.

8. The method of claim 6, wherein the detecting unit comprises a capturing device,
    wherein the detecting of the motion is performed by determining a specific body part of the user from images captured by the capturing device and detecting a movement of the specific body part.

9. The interface apparatus of claim 2, wherein the one or more of the control terminal and the control unit sets the movement speed of the pointer according to the set movement range of the pointer.

10. The method of claim 6, further comprising:
    setting a movement speed of the pointer displayed on the display unit.

11. The method of claim 10, wherein the movement speed of the pointer is set according to the set movement range.

12. The interface apparatus of claim 1, wherein matching a maximum movement value further comprises matching each one of a plurality of maximum dimensions of the detected movement trajectory of the user with each one of a plurality of maximum dimensions of the movement range of the pointer on the display unit.

13. The method of claim 6, wherein matching the calculated maximum movement value further comprises matching each one of a plurality of maximum dimensions of the detected movement trajectory of the user with each one of a plurality of maximum dimensions of the movement range of the pointer on the display unit.

14. The interface apparatus of claim 12, wherein the plurality of maximum dimensions of the detected movement trajectory of the user comprise a maximum vertical distance and a maximum horizontal distance.

15. The method of claim 13, wherein the plurality of maximum dimensions of the detected movement trajectory of the user comprise a maximum vertical distance and a maximum horizontal distance.

* * * * *